United States Patent

[11] 3,583,108

| [72] | Inventors | Kenzaburo Oishi;<br>Hiroshi Ota, both of Kariya, Japan |
| --- | --- | --- |
| [21] | Appl. No. | 820,183 |
| [22] | Filed | Apr. 29, 1969 |
| [45] | Patented | June 8, 1971 |
| [73] | Assignee | Toyoda Koki Kabushiki Kaisha, trading as<br>Toyoda Machine Works, Ltd.<br>Kariya, Japan |
| [32] | Priority | Apr. 30, 1968 |
| [33] | | Japan |
| [31] | | 43/28909 |

[54] MACHINE TOOL FOR GRINDING PINS OF A CRANKSHAFT
8 Claims, 8 Drawing Figs.

[52] U.S. Cl. .................................................. 51/237, 51/216
[51] Int. Cl. .................................................... B24b 5/42, B24b 41/06
[50] Field of Search ........................................ 51/237 CS, 237 R, 105 SP, 105 EC, 216.5

[56] References Cited
UNITED STATES PATENTS

| 2,460,731 | 2/1949 | Belden et al. | 51/237X |
| --- | --- | --- | --- |
| 2,600,824 | 6/1952 | Zwick | 51/237 |

*Primary Examiner*—Granville Y. Custer, Jr.
*Assistant Examiner*—Neil Abrams
*Attorney*—Hutchinson & Milans

ABSTRACT: A machine tool for grinding pins of a crankshaft which comprises an indexing mechanism and work centers free to advance and retract for operatively engaging and lifting the journals of a crankshaft up and away from the bearing faces of the clamping fixtures during indexing. The journals of the crankshaft are supported by the clamping fixtures on bearing faces carried by the fixtures when the axis of a pin or pins of the crankshaft is in alignment with the common axis of the spindles for rotation therewith during grinding of said pin or pins of the crankshaft, but are lifted up by the advancement of the work centers so as not to be in frictional contact with the bearing faces during indexing thereby keeping the journals of the crankshaft from being damaged by abrasive grains and grinding chips.

INVENTORS:
KENZABURO OISHI and HIROSHI OTA

By: *Hutchinson & Milans*
Attorneys

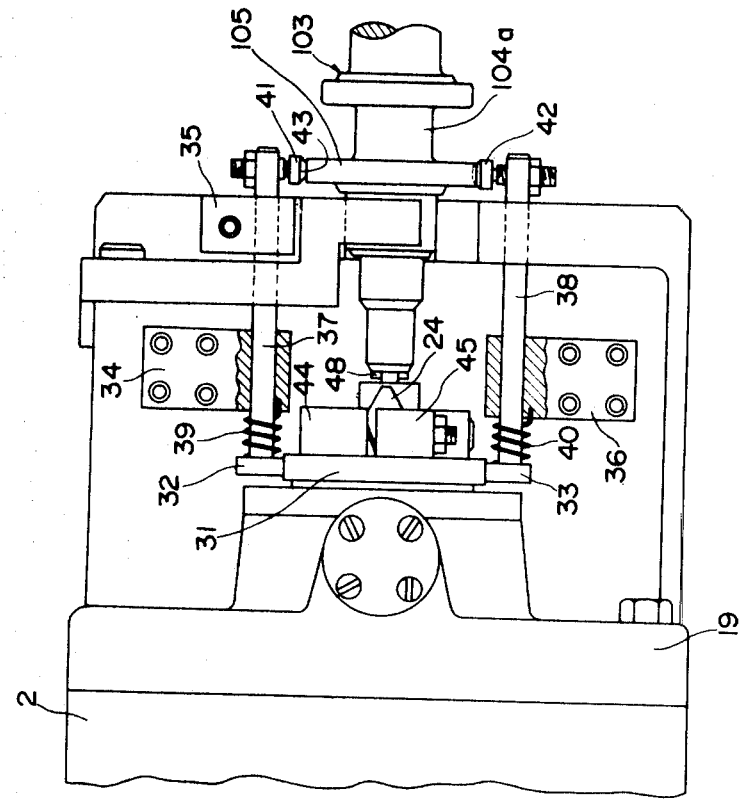

INVENTORS:
KENZABURO OISHI and HIROSHI OTA

By: Hutchinson & Milans
Attorneys

MACHINE TOOL FOR GRINDING PINS OF A CRANKSHAFT

BACKGROUND OF THE INVENTION

The present invention relates to a machine tool for grinding pins of a crankshaft and more particularly to a machine tool for grinding pins of a crankshaft where the crankshaft is lifted up from the bearing faces of the clamping fixtures during the indexing process by rotating a pin or pins of the crankshaft to be in alignment with the common axis of the spindles ready for the grinding process.

As well known, in a crankpin grinding machine for grinding a plurality of crankpins, it is an essential requirement to align the axis of the crankpins with the common axis of the spindles rotatably mounted through the headstock and the footstock respectively in order to grind the crankpins by a single grinding wheel or tool. Many devices for aligning the axis of the crankpins have been proposed and put to practical use, but they all have certain common disadvantages which will be described in the following.

In every prior art device, the crankshaft is indexed by the angular rotation of the journals of the crankshaft relative to the bearing faces of the clamping fixtures while the former is in contact with the latter, which support the former. Grinding chips and abrasive grains produced during the grinding process will cling to the journals of the crankshaft and enter between the journals of the crankshaft and the bearing faces of the clamping fixtures while the crankshaft is being angularly indexed by rotation thereof relative to the bearing faces. The bearing faces of the clamping fixtures are formed to fit partially with the peripheries of the journals of the crankshaft and to be in plane contact with each other. Accordingly every prior art grinding machine of this type has a fatal disadvantage in that the crankshaft journals are damaged through the rotation thereof relative to the bearing faces due to the presence therebetween of the grinding chips and abrasive grains. The damage to the surfaces of the crankshaft journals brought about by the grinding chips and abrasive grains is so serious that it is not even eliminated or cured after the final machining step in the machining process.

The friction between the crankshaft journals and the bearing faces is inevitably great because of close tolerances and little clearance allowed therebetween in order to achieve the proper indexing accuracy and this is further increased due to the presence of abrasive grains and grinding chips between the contacting parts of the journals and the bearing faces. The friction thus produced prevents the relative rotational movement between the crankshaft journals and the bearing faces from being a smooth operation, and becomes even more serious in view of the current demand for large-sized crankshafts. It sometimes happens as a result of this condition that the crankshaft will even slip out of the clamping fixtures, thus causing a serious failure and work stoppage. The so far mentioned disadvantages are those common to all the crankpin grinding machines in the prior art. The present invention has been proposed first to solve those disadvantages inherent to the prior art devices.

SUMMARY OF THE INVENTION

An object of the present invention is to provide a machine tool for grinding pins of a crankshaft which has a crankpin indexing mechanism for accomplishing the alignment of the axis of a pin or pins of a crankshaft with the common axis of the spindles without any contact of the crankshaft with the bearing faces of the clamping fixtures, said spindles being mounted through the headstock and the footstock respectively for rotating the crankshaft through the clamping fixtures during the grinding process.

Another object of the present invention is to provide a grinding machine having an indexing mechanism which prevents damage occurring to the crankshaft journals while the crankshaft is rotated on its axis during the indexing process to have the axis of a pin or pins thereof aligned with the axis of the spindles.

A further object of the present invention is to provide a grinding machine having an indexing mechanism which accomplishes indexing of the crankpins with less failures and with a high degree of accuracy.

A still further object of the present invention is to provide a grinding machine having clamping fixtures where grinding chips and abrasive grains, produced during the grinding process and which normally cling to the crankshaft journals, are cleared away by air under pressure.

A still further object of the present invention is to provide a grinding machine having locating stops which are operative to regulate the indexing movement by positioning the axis of a pin or pins of the crankshaft in alignment with the common axis of the spindles by engaging the reference plane on the crankshaft.

DESCRIPTION OF THE DRAWINGS

The foregoing and other objects and features of the present invention will become fully apparent from the following description of a preferred embodiment of the present invention with reference to the accompanying drawings in which:

FIG. 5 is a top plan view of the clamping fixture of the FIG. 4 taken along the line V–V;

DESCRIPTION OF THE PREFERRED EMBODIMENT

Figure 1:
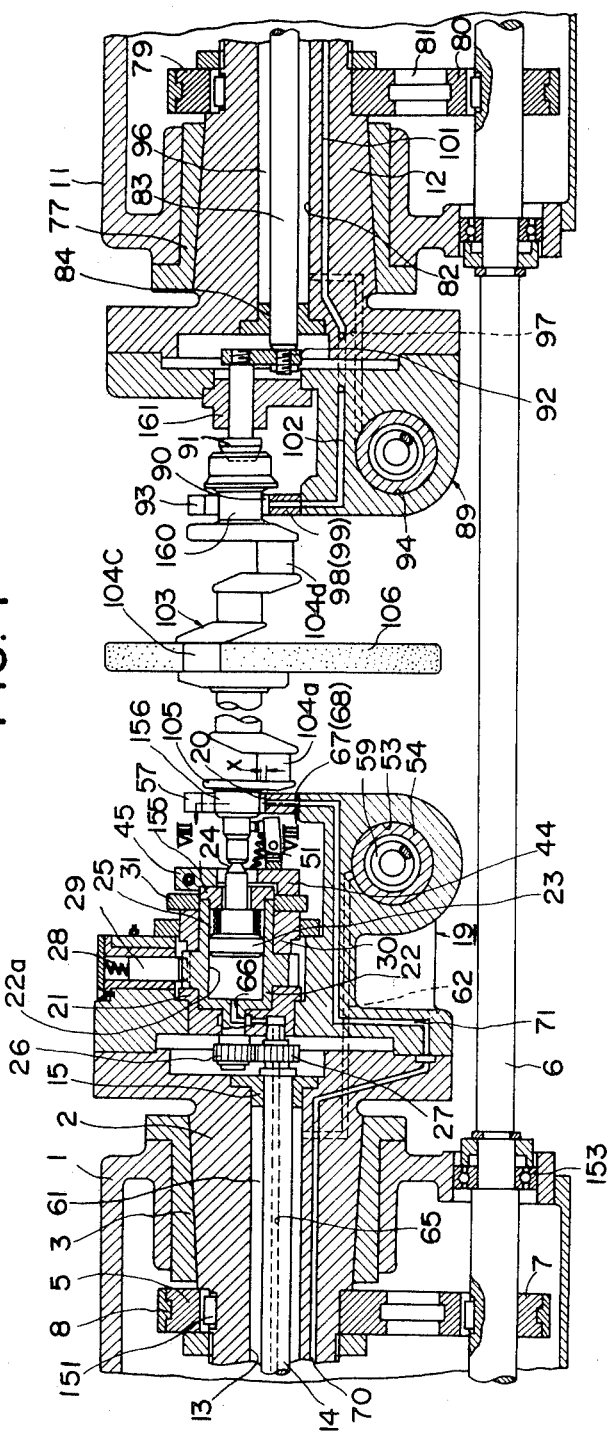
FIG. 1 is a vertical longitudinal sectional view of a major portion of a crankpin grinding machine as a preferred embodiment according to the present invention at the headstock and the footstock thereof operatively shown under the indexing mechanism.
Figure 2:
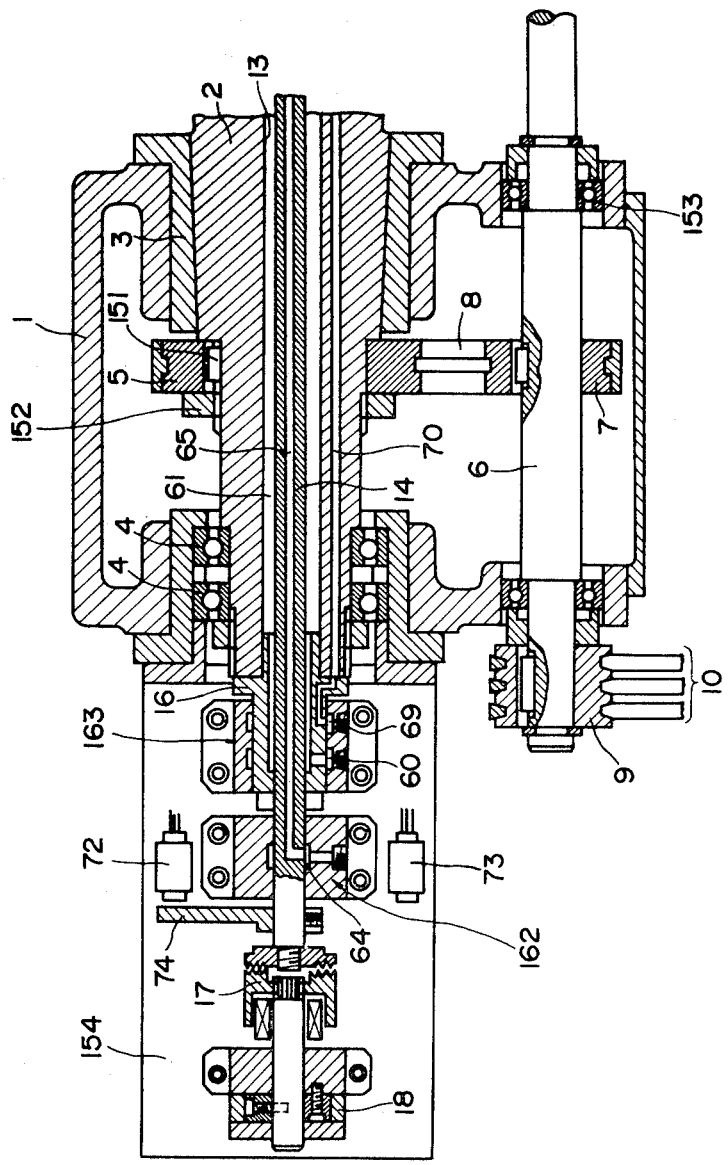
FIG. 2 is a vertical longitudinal sectional view of the headstock of the crankpin grinding machine.
Figure 4:
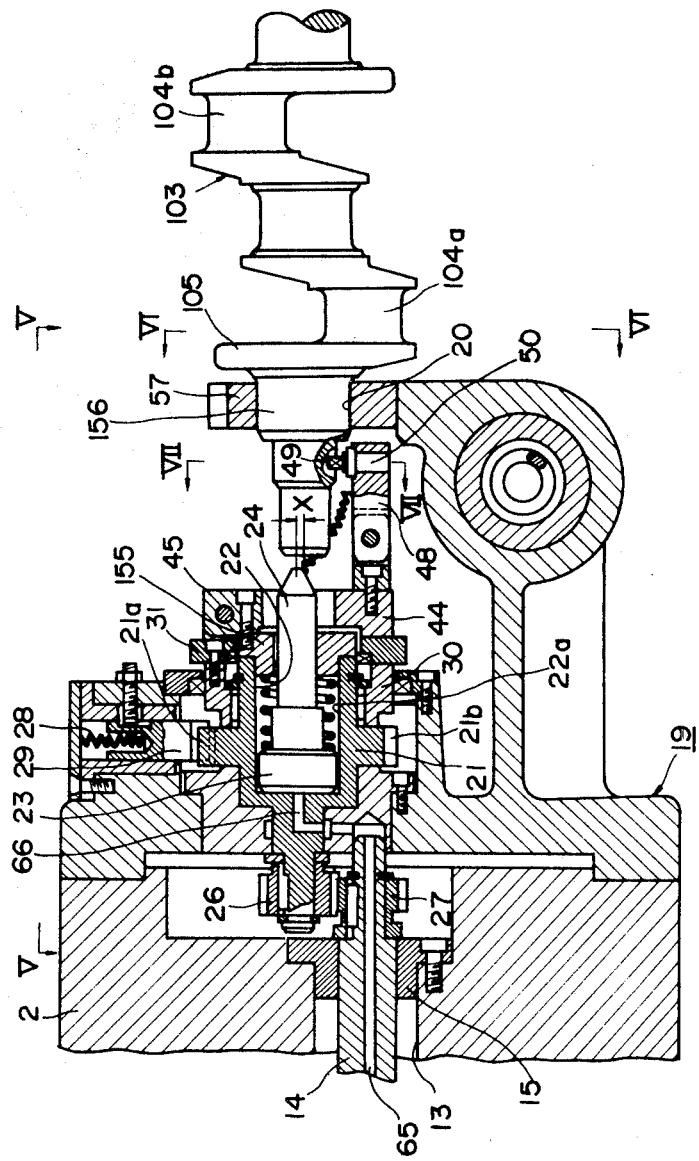
FIG. 4 is a detailed longitudinal sectional view, on a somewhat enlarged scale, of the clamping fixture illustrated in FIG. 1 having a journal of a crankshaft clamped thereto.

A crankpin grinding machine of a preferred embodiment according to the present invention will now be described. Referring now to FIGS. 1, 2 and 4, a headstock 1 is mounted on an indexing table (not shown) of the crankpin grinding machine. A spindle 2 is rotatably mounted in bearing members 3 and 4 carried by the headstock 1. A chain wheel 5 is supported by the spindle 2 intermediate its ends and retained from relative rotation with the spindle 2 by means of a key 151 and from axial movement by means of a nut 152. A chain 8 connects the chain wheel 5 with another chain wheel 7 which is keyed to a synchronous driving shaft 6 rotatably mounted in antifriction bearings 153 in the headstock 1 in parallel relationship with the spindle 2. The synchronous driving shaft 6 has a multiple V-Grooved pulley 9 at the left-hand end (FIG. 2), which is connected to a drive means (not shown) through belts 10. Thus the spindle 2 is rotated by the drive means through the belts 10, pulley 9, the chain wheel 7, the chain 8 and the chain wheel 5. The other end of the synchronous driving shaft 6 extends toward and through a footstock 11 and is operatively connected to a spindle 12 rotatably mounted through the footstock 11 in such a manner as hereinafter described. An internal bore 13 is coaxially perforated through the spindle 2, through which a rotatable shaft 14 passes. The rotatable shaft 14 is rotatably supported with supporting members 15 and 16 fitted to both ends of the bore 13. A supporting plate 154 fixed to the left side of the headstock 1 extends toward the left as viewed in FIG. 2 and carries devices such as a rotary hydraulic motor 18, a magnetic clutch 17 and distributors 162 and 163. The rotary hydraulic motor 18 is employed for aligning the crankpin or pins and is separably connected to the left-hand end of the rotatable shaft 14 through the magnetic clutch 17. Upon energization of the magnetic clutch 17, the rotary hydraulic motor 18 is connected to the shaft 14 so that the crankpins are rotated to have the axis thereof aligned with the common axis of the spindles 2 and 12, which are in turn aligned with each other. To separate the rotary hydraulic motor 18 from the shaft 14, the clutch 18 is deenergized. A clamping fixture 19 is mounted on the right-hand end of the spindle 2, as shown in FIGS. 1 and 4. A semicircular bearing face 20 formed on the clamping fixture 19 is set eccentric to the axis of the spindle 2 so that the axis of the crankpins may be aligned with the axis of the spindle 2. The bearing face 20 is shaped to fit with the periphery of the crankshaft journal 156. An indexing disc 21 is rotatably provided inside the clamping fixture. The indexing disc 21 is equipped with a reciprocatory hydraulic motor 22 consisting of a concentric blind cylindrical bore 22a formed therein and a piston 23 slidably accommodated in the blind bore 22a. The open side of the blind bore 22a is covered with a closure plate 155. A right-hand extension of the piston 23 passes through an aperture in the plate 155 to form a left work center 24 which functionally supports the left end of the crankshaft 103. The axis of the work center is set eccentric by a distance $x$ from the axis of the crankshaft journal in the state where the latter is clamped on the bearing face 20.

Normally the left work center 24 is held in retracted position to the left by a spring 25 interposed between the piston 23 and the plate 155 as shown in FIG. 4. The center 24 is moved to the right by fluid under pressure to support the crankshaft in cooperating relationship with a right work center 91 and to lift it up above the bearing faces of the clamping fixtures. Keyed to the left-hand end of the indexing disc 21 is a gear 26 which meshes with a gear 27 keyed to the right-hand end of the shaft 14. For grinding the crankshaft of a four cylinder engine, the indexing disc 21 is provided with two recesses 21a and 21b spaced by 180° apart on a flange portion of the index disc 21 intermediate its ends. A stop member 29, mounted in the body of the clamping fixture 19 and movable in a direction perpendicular to the axis of the indexing disc 21, is biased toward the periphery of the flange of the indexing disc 21 by spring 28, so as to be engaged with the recesses 21a or 21b. The recesses 21a and 21b are formed to engage the stop member 29 when the disc 21 is rotated in one particular direction.

Figure 7:
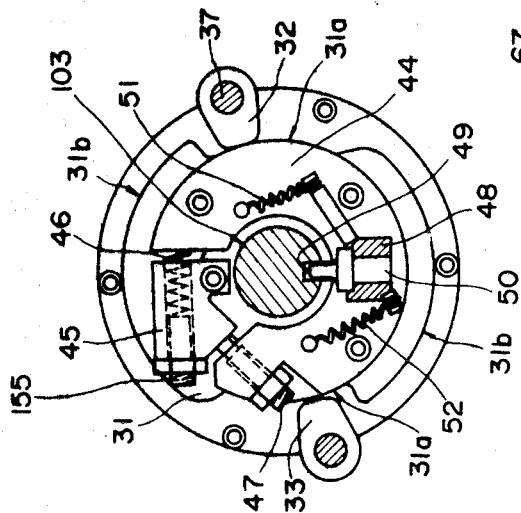
FIG. 7 is a side elevational view with parts in section of FIG. 4 taken along the line VII–VII.

A rotatable sleeve 30 is rotatably mounted on the external periphery of the indexing plate 21 and carries a cam plate 31 fixed thereto. There are provided smaller-diameter cam surfaces 31a and larger-diameter drive cam surfaces 31b on the cam plate 31, as shown in FIG. 7. Operative cams 32 and 33 are arranged to be able to engage with the cam surfaces 31a and 31b. As shown in FIG. 5, an operative cam 32 is fixed at the left-hand end of a connecting rod 37 which is rotatably A ring member 44 is fixed on the cam plate 31 and is cut away partially as shown in FIG. 7. A pivotable member 45 which pivotably supported with the indexing disc 21 is interposed in the cutaway portion. A compression spring 46 is interposed between the pivotable member 45 and the ring member 44. One end of the spring 46 is located against one end of an adjust screw 155 threaded into member 45, while the opposite end of the spring abuts the member 44, thus providing means for adjusting the compression force of the spring 46. Although both members 44 and 45 are normally moved as a unit, relative movement between them is obtained by compressing the spring 46. A screw 47 is threadedly engaged with the ring member 44, as shown in FIG. 7, and one end of the screw engages with a face of the pivotable member 45 to control the range of relative movement between the members 44 and 45.

A driving member 48 is pivotably mounted on the ring member 44 wherein there is provided a pin 50 which engages with a reference recess 49 on the crankshaft. The driving member 48 may be pivotable within a predetermined distance and is always urged toward the crankshaft by means of springs 51 and 52 which are provided between the ring member 44 and the member 48, as shown in FIG. 7.

Figure 6:
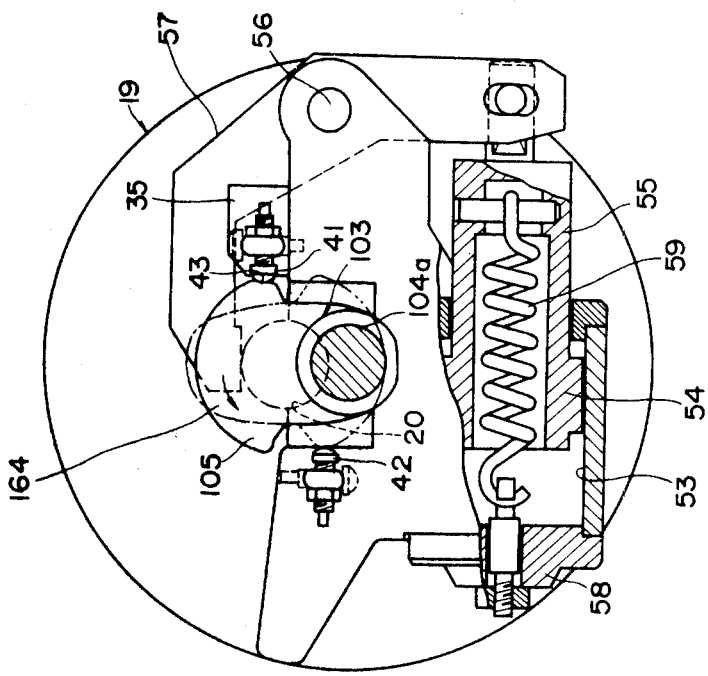
FIG. 6 is a side elevational view view of the clamping fixture of FIG. 4 partially cutaway taken along the line VI–VI.

A clamp arm clamping hydraulic motor 53 having a piston 54 slidably mounted therein, is provided in the clamping fixture 19. Fixed to the clamping fixture 19 by means of a hinge pin 56 at the center is a clamp arm 57 one end of which is connected with the piston rod 55 extending from the piston 54. A tension spring 59 is interposed between the piston 54 and a cylindrical closure cap 58 and serves to pull the piston 54 inward of the cylinder or towards the left end position, thereby urging the clamp arm 57 towards open position. The clamp arm 57 is moved to clamping position by the movement of the piston 54 toward the right (FIG. 6) under the influence of fluid under pressure. The fluid under pressure is introduced to the hydraulic motor 53 through fluid passages 61 and 62, the former passage 61 formed by the internal bore 13 of the spindle 2 and the shaft 14 and connected with a port 60 of the distributor 163.

The pressurized fluid is introduced through fluid passages 65 and 66 to the hydraulic motor 22 in order to advance the left work center 24, the former passage extending inside the shaft 14 and connected to a port 64 of the distributor 162.

Figure 8:
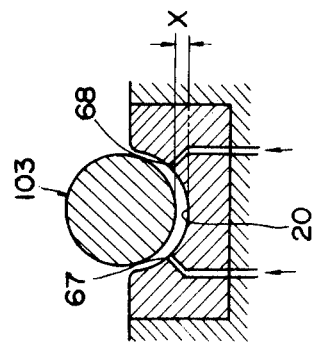
FIG. 8 is a fragmentary detailed sectional view of FIG. 1 taken along the line VIII–VIII.

There are provided a pair of air outlets 67 and 68 on the surface of the bearing face 20 as best shown in FIG. 8. The air under pressure is introduced to the outlets from an air source (not shown) through a port 69 of the distributor 163 and air passages 70 and 71 and is thence discharged to the atmosphere. The proximate switches 72 and 73, actuated by means of a metallic member 74 fixed on the shaft 14, confirm the crankpins to be placed in alignment with the common axis of the spindles 2 and 12.

Figure 3:
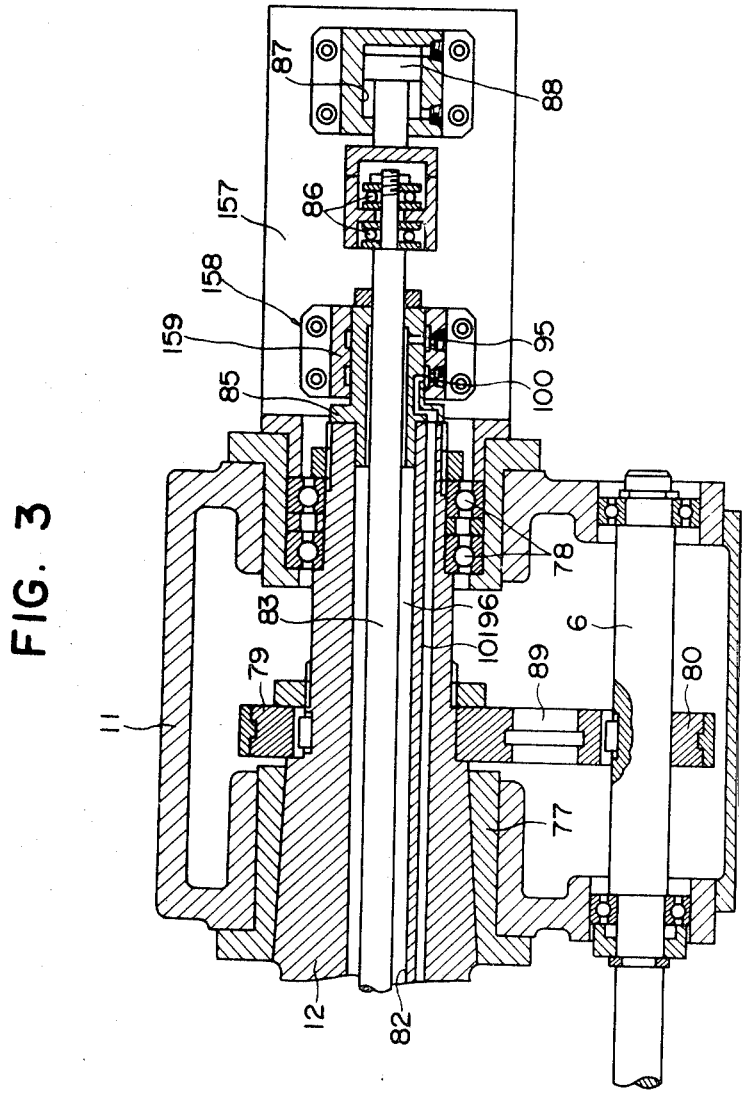
FIG. 3 is a vertical longitudinal sectional view of the footstock of the crankpin grinding machine.

Referring now to FIGS. 1 and 3, the footstock 11 is mounted on the indexing table (not shown) of the crankpin grinding machine. The footstock 11 supports the rotatable spindle 12 in bearing members 77 and 78 carried by the foot- The spindle 12 has a clamping fixture 89 at its left-hand end. The clamping fixture 89 has a bearing face 90 which is set eccentric to the axis of the spindle 12 so that the crankpins may be aligned with the axis of the spindle 12. The bearing face 90 is shaped to fit the periphery of the crank journal 160. The right work center 91, aligned with the left work center 24, is slidably mounted in a block 161 fixed on the body of the clamping fixture 89. The right work center 91 is also set eccentric by a distance $x$ from the axis of the crankshaft on the bearing face 90 whereby when the right work center 91 supports the crankshaft cooperating with the left work center 24, the crankshaft 103 is lifted up above the bearing face 90 by that eccentricity $x$. The rear or right-hand end of the right work center 91 is connected by means of a connecting bar 92 with the front end of the shaft 83. A clamp arm 93, similar to the above-mentioned clamp arm 57, is pivotably supported with the clamping fixture 89, and one end of the clamp arm 93 is operably connected to a clamp arm clamping hydraulic motor 94 to actuate the clamp arm 93. The motor 94 has the same construction as the motor 53. Fluid under pressure supplied from a source (not shown) is introduced to the motor 94 from a port 95 of the distributor 158 through fluid passages 96 and 97. Pressurized air supplied from the source is introduced to air outlets 98 and 99 on the bearing face 90 from a port 100 of the distributor 158 and passes through air passages 101 and 102 and is thence discharged into the atmosphere.

Numeral 103 indicates a crankshaft which has crankpins 104a, 104b, 104c and 104d which are eccentric to the crankshaft journals by a predetermined distance and the balancing weight portion 105 having said reference plane 43 thereon. The first crankpin 104a and the fourth crankpin 104d are aligned with each other and the second crankpin 104b and the third crankpin 104c are also aligned with each other. A grinding wheel 106 for grinding said crankpins 104a, 104b, 104c and 104d is rotatably mounted on a wheel slide (not shown).

OPERATION

The operation and working of the crankpin grinding machine according to the present invention will now be described.

The crankshaft is at first placed between and on the clamping fixtures 19 and 89 in such a manner that the first crankpin 104a and the fourth crankpin 104d are positioned downwardly, as shown in FIG. 1. The spring 46 is then manually urged to move slightly the pin 50 into engagement with the recess 49 provided on the crankshaft, whereby the journals 156 and 160 of both ends of the crankshaft 103 are seated on the respective bearing faces 20 and 90 of the clamping fixtures. Upon completion of the crankshaft 103 mounting on the bearing faces 20 and 90 of the clamping fixtures 19 and 89, the magnetic clutch 17 is next energized to connect the rotary hydraulic motor 18 to the shaft 14. At this time the reference plane 43 on the balancing weight 105 is kept in engagement with the stop 41 by means of the spring 46 biasing the former against the latter through the ring member 44, the drive member 48 and the pin 50, since the indexing disc 21 is urged so as to keep the engagement between the recess 21a and the stop member 29 by means of the force produced by the rotary hydraulic motor 18.

Then an aligning device (not shown) is advanced to have the axial location of the fourth crankpin 104d aligned completely with that of the grinding wheel 106. Fluid under pressure is next introduced from a source (not shown) to the hydraulic motors 53 and 94 through respective fluid passages to clamp the journal portions 156 and 160 with the clamp arms 57 and 93. In this state, the common axis of the first and fourth crankpins 104a and 104d is in alignment with the common axis of the spindles 2 and 12 whereby the crankshaft 103 is located ready for rotating about the common axis of the first and fourth pins. Thereafter the magnetic clutch 17 is deenergized to separate the shaft 14 from the rotary hydraulic motor 18 and the aligning device is retracted. Then the synchronous driving shaft 6 is rotated by the motor, resulting in the synchronous rotation of the spindles 2 and 12 journaled in the headstock 1 and the footstock 11 respectively. Simultaneously, the grinding wheel 106 carried by the wheel slide (not shown) is advanced by a suitable feed mechanism to the fourth crankpin 104d for grinding it. Toward the end of the grinding operation, an automatic sizing device (not shown) is advanced to engage with the crankpin 104d for measuring the diameter thereof. Upon measuring a predetermined diameter of the crankpin 104d, the sizing device produces a signal to retract the grinding wheel 106. When the grinding wheel 106 is retracted, the table (not shown) having the headstock 1 and the footstock 11 thereon is shifted to bring the first crankpin 104a to the position corresponding to the grinding wheel 106. Simultaneously, the rotation of the spindles 2 and 12 is stopped with the upward surfaces of the bearing faces 20 and 90 of the clamping fixtures 19 and 89 supporting the crankshaft thereon at the two ends. Then, valves (not shown) in the circuit connecting the fluid source to the hydraulic motors 53 and 94 are operated to discharge the fluid within the hydraulic motors 53 and 94, whereby the clamp arms 57 and 93 are released for unclamping the crankshaft journals 156 and 160. The magnetic clutch 17 is thereafter energized so that the operation for aligning the axial location of the crankpin 104a with that of the grinding wheel 106 and then grinding the former by the advancement of the latter is repeated completely in the same manner as in the fourth crankpin 104d.

Upon accomplishment of the grinding process of the first and fourth crankpins 104a and 104d, the table (not shown) is shifted to bring the third crankpin 104c to the position corresponding to the grinding wheel 106, while the rotation of the spindles 2 and 12 is stopped with the upward surfaces of the bearing faces 20 and 90 of the clamping fixtures 19 and 89 supporting the crankshaft thereon. The clamp arms 57 and 93 are then released. On unclamping the crankshaft journals, the fluid under pressure is introduced to the hydraulic motor 22 for advancing the left work center 24 through the fluid passages 65 and 66. Simultaneously fluid under pressure is introduced to the other hydraulic motor 87 to advance the right work center 91. Thus the crankshaft 103 is supported on its ends by the advanced work centers 24 and 91.

As above mentioned, since the common axis of the crankshaft journals 156 and 160, when mounted on the bearing faces 20 and 90, is not aligned with the common axis of the left and right work centers 24 and 91, the journals 156 and 160, when supported by the centers 24 and 91, are lifted by a distance $x$ equal to the eccentric amount, as shown in FIGS. 1, 4 and 8. The pin 50 is not disengaged from the recess 49 on the crankshaft 103 even if the crankshaft is lifted, since the drive member 48 is always urged toward the crankshaft 103 by the tension of springs 51 and 52. With the journals lifted up from the bearing faces 20 and 90, pressurized air is jetted from the outlets 67, 68, 98 and 99 through the clearances between the crankshaft journals and bearing faces and out into the atmosphere.

The magnetic clutch 17 is next energized to connect the rotary hydraulic motor 18 to the shaft 14. Then fluid under pressure is introduced to the rotary motor 18 to rotate the shaft 14. The rotation of the shaft 14 is transmitted to the indexing plate 21 through the gears 27 and 26 and thence to the cam plate 31 through the pivotable member 45 and the ring member 44 fixed on the cam plate 31. With the rotational movement of the ring member 44 the crankshaft 103 is also rotated about the axis of the journals to have pins indexed through the drive member 48 and the pin 50. At this time the crankshaft 103 is rotated in the direction shown by an arrow 164 in FIG. 6. As the rotation of the cam plate 31 makes the greater diameter cam surfaces 31b thereon engage the operative cams 32 and 33, the cams 32 and 33 are rotated by overcoming the torsional forces of the torsion springs 39 and 40 respectively. This causes the connecting rods 37 and 38 to shift the locating stops 41 and 42 into such a position that they do not interfere with the balancing weight 105 on the crankshaft 103 (shown in phantom lines in FIG. 6).

After the above has occurred, the recess 21b on the indexing disc 21 overruns the stop member 29 when the crankshaft 103 is rotated by more than 180° from the starting position of the indexing process but stops due to the signal produced by the approximate switch 73. Simultaneously, the cam surfaces of the cam plate 31, engaging the operative cams 32 and 33, are changed from the surfaces 31b to the surfaces 31a by the force of the torsion springs 39 and 40 resulting in the locating stops 41 and 42 returning to the initial position where they may engage with the reference plane 43 on the balancing weight 105.

After the recess 21b on the indexing disc has overrun the stop member 29, the rotary motor 18 is reversely operated to revolve the indexing disc 21 and the crankshaft 103 in the reverse direction through the above mentioned transmitting mechanism until the recess 21b engages with the stop member 29 and the reference plane 43 engages with the stop 42. The stop member 29 interrupts the force of the rotary motor 18 which is strong enough to bend the connecting rods 37 and 38. With interruption of the force, the reference plane is urged toward the stop 42 by the compression spring 46 to thereby obtain the high positioning accuracy. Thus the crankshaft 103 is located with high accuracy in such a position that it is ready for rotation about the common axis of the second and third crankpins 104b and 104c, spaced apart from the first and fourth crankpins 104a and 104d by 180°.

Upon thus completing the indexing process of the second and third crankpins 104b and 104c, the right and left work centers 24 and 91 are retracted by the compression spring 25 and the hydraulic motor 87 operated by the pressurized fluid respectively whereby the crankshaft journals 156 and 160 are again mounted on the bearing faces 20 and 90 of the clamping fixtures and the axis of the second and third crankpins is now in alignment with the common axis of the spindles 2 and 12. The axial location of the third crankpin 104c is aligned with that of the grinding wheel by the aligning device. Thereby, the fluid under pressure is introduced into the hydraulic motors 53 and 94 so as to clamp the crankshaft journals 156 and 160 by means of the clamp arms 57 and 93. The magnetic clutch 17 is disenergized thereafter and the aligning device is retracted. The spindles 2 and 12 are rotated synchronously and the grinding wheel 106 is advanced to grind the third crankpin 104c completely in the same manner as described. The grinding process of the second crankpin 104b is then repeated following that of the third crankpin 104c in the same manner as described with reference to the first crankpin 104a following the fourth crankpin 104d.

Now that all the crankpins on the crankshaft have been ground, the clamp arms 57 and 93 are opened to unclamp the crankshaft journals. The crankshaft 103 is then supported again with the left and right work centers 24 and 91 to thereby lift the crankshaft journals 156 and 160 up from the bearing faces 20 and 90 of the clamping fixtures 19 and 89. Pressurized fluid is introduced to the rotary hydraulic motor 18 to revolve the crankshaft by 180° into its initial position by the same process as the above mentioned indexing process. Then the crankshaft 103 is unloaded from the clamping fixtures 19 and 89.

Although one preferred embodiment of the present invention has been described, various modifications may be possible as follows: For instance, 1. According to the principle of the invention, the crankshaft 103 is located in position by pressing the reference plane 43 machined on the balancing weight portion 105 against the locating stop 41 or 42. However in case that the crankshaft 103 is aligned by engaging a reference pin or drive pin 50 attached to the indexing disc 21 with a reference recess on the crankshaft 103, the crankshaft may be located by the engagement of recesses 21a or 21b on the indexing disc and the topping member 29; and 2. Though the description has been made on the crankshaft 103 for use as four cylinder engine, it is to be understood that some modifications may be be possible for grinding a crankshaft for an engine of any number of cylinders with great ease by persons skilled in the art.

The advantages of the present invention are not limited to the specific structure illustrated herein but applicable to various machine tools for grinding other workpieces similar to crankshafts and having journals to be supported and portions to be ground in eccentric relation to the journals.

We claim:

1. A machine tool for grinding pins of a crankshaft comprising: a headstock including a rotatable spindle, a footstock including a rotatable spindle aligned with said spindle in said headstock, clamping fixtures mounted respectively on said spindles and provided with bearing faces to support the crankshaft thereon with the axis of a pin or pins of the crankshaft being in alignment with the common axis of said spindles, means for clamping said crankshaft on said bearing faces, an indexing mechanism mounted in said headstock and operably rotating the crankshaft relative to said clamping fixtures for indexing and thereby positioning the axis of a pin or pins of the crankshaft in alignment with the common axis of said spindles, and work centers slidably mounted in said clamping fixtures for engaging and lifting the crankshaft by a predetermined distance away from said bearing faces by the advancement of said work centers whereby a pin or pins of the crankshaft may be indexed without any contact between the crankshaft and said bearing faces, the centerline of said work centers being offset from the centerline of the portions of the crankshaft supported on said bearing faces.

2. A machine tool for grinding pins of a crankshaft as defined in claim 1, wherein said indexing mechanism comprises an indexing disc having recesses on the periphery thereof, rotary means for rotating said indexing disc, switching means for producing signals to control said rotary means and a stop member for positioning the axis of a pin or pins of a crankshaft in alignment with the common axis of said spindles by engaging with said recesses.

3. A machine tool for grinding pins of a crankshaft as defined in claim 1, wherein said bearing faces are provided with outlets, means for supplying fluid under pressure through said outlets into a clearance between said bearing faces and the crankshaft while the latter is lifted away from said bearing faces by the advancement of said work centers thereby cleaning said bearing faces and the crankshaft.

4. A machine tool for grinding pins of a crankshaft comprising: a headstock including a rotatable spindle, a footstock including a rotatable spindle aligned with said spindle in said headstock, clamping fixtures respectively mounted on said spindles and provided with bearing faces to support the crankshaft thereon with the axis of a pin or pins of the crankshaft being in alignment with the common axis of said spindles, means for clamping the crankshaft on said bearing faces, and indexing mechanism carried by said headstock and operably rotating the crankshaft relative to said clamping fixtures for shifting a pin or pins of the crankshaft by a predetermined extent, act least one locating stop mounted in one of said clamping fixtures and regulating the indexing movement by said indexing mechanism so as to position the axis of a pin or pins of the crankshaft in alignment with the common axis of said spindles by engaging with a reference plane provided on the crankshaft, and work centers slidably mounted in said clamping fixtures for supporting and lifting the crankshaft by a predetermined distance away from said bearing faces upon the advancement of said work centers, whereby a pin or pins of the crankshaft are indexed without any contact between the crankshaft and said bearing faces, the centerline of said work centers being offset from the centerline of the portions of the crankshaft supported on said bearing faces.

5. A machine tool for grinding pins of a crankshaft as defined in claim 4, wherein said indexing mechanism comprises an indexing disc having recesses on the periphery thereof, rotary means for rotating said indexing disc, switching means for producing signals to control said rotary means, a stop member operably interrupting of said rotary means by engagement with said recesses, a driving pin operably connected with said indexing disc and entering into a reference recess provided on the crankshaft for indexing a pin or pins of the crankshaft and a spring means for resiliently connecting said driving pin and said indexing disc, thereby urging the crankshaft toward one of said locating stops.

6. A machine tool for grinding pins of a crankshaft as defined in claim 4, wherein said bearing faces are provided with air outlet ports, means for introducing air under pressure through said air outlet ports into a clearance between said bearing faces and the crankshaft while the crankshaft is lifted away from said bearing faces upon the advancement of said work centers, said air being discharged into the atmosphere through said clearance, thereby cleaning said bearing faces and the crankshaft.

7. A machine tool for grinding pins of a crankshaft comprising: a headstock including a rotatable spindle, a footstock including a rotatable spindle aligned with said spindle on said headstock, clamping fixtures mounted on said spindles and provided with bearing faces to support the crankshaft thereon while the axis of a pin or pins of the crankshaft is in alignment with the common axis of said spindles, means for clamping the crankshaft on said bearing faces, an indexing disc rotatably mounted in said clamping fixture in said headstock, and provided with recesses on the periphery thereof, rotary means for operably rotating said indexing disc and being connected with said indexing disc by a shaft passing through said spindle in said headstock, switching means for producing signals to control said rotary means, a stop member operably interrupting the force of said rotary means by engagement with said recesses on said indexing disc, a driving pin operably connected with said disc and being engageable with a reference recess on the crankshaft for indexing a pin or pins thereof, spring means for resiliently connecting said driving pin and said indexing disc, at least one locating stop provided on said clamping fixture of said headstock and operably regulating the indexing movement to position the axis of a pin or pins of the crankshaft in alignment with the common axis of said spindles by engaging with the reference plane on the crankshaft, and work centers being mounted in said clamping fixtures free to advance and retract by a power means, said centers having conical ends for engagement with opposite ends of the crankshaft and operably lifting the crankshaft away from said bearing faces by a predetermined distance on the advancement of said work centers and engagement with the ends of said crankshaft, whereby a pin or pins of the crankshaft may be indexed without any contact between the crankshaft and said bearing faces, the centerline of said work centers being offset from the centerline of the portions of the crankshaft supported on said bearing faces.

8. A machine tool for grinding pins of a crankshaft as defined in claim 7, wherein said bearing faces are provided with air outlet ports, means for introducing air under pressure through said air outlet ports into the clearance between said bearing faces and the crankshaft while the crankshaft is lifted away from said bearing faces by the advancement of said work centers, said air being discharged into the atmosphere through said clearance, thereby cleaning said bearing faces and the crankshaft from foreign particles and matter.